Figure 1:
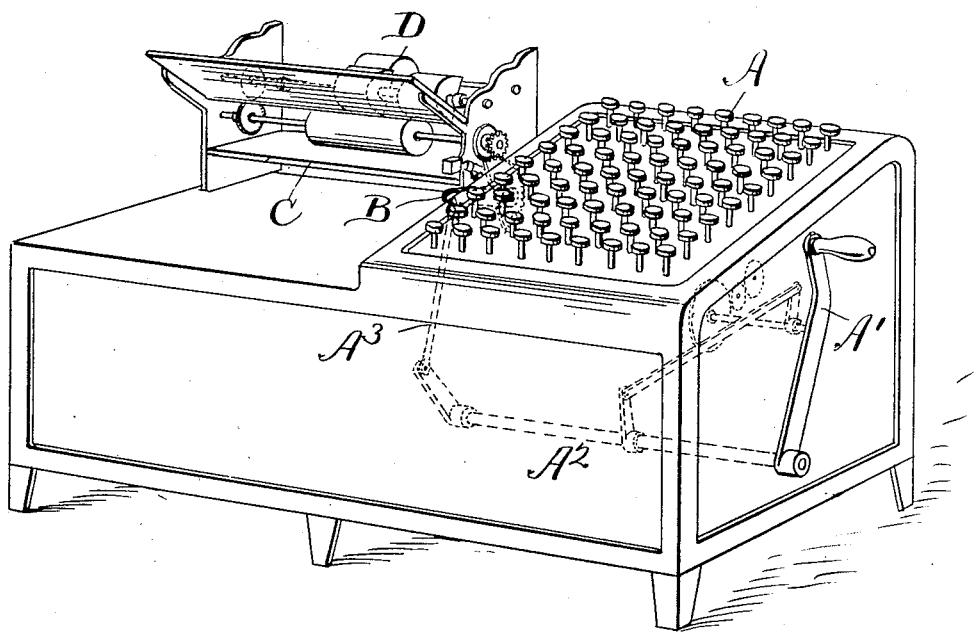

J. H. WHITELAW.
COMBINED TABULATING AND INDORSING APPARATUS.
APPLICATION FILED DEC. 7, 1907.

964,724.

Patented July 19, 1910.

Witnesses
E. B. Gilchrist
H. R. Sullivan

Inventor
James H. Whitelaw
by
Thurston Woodward
attys

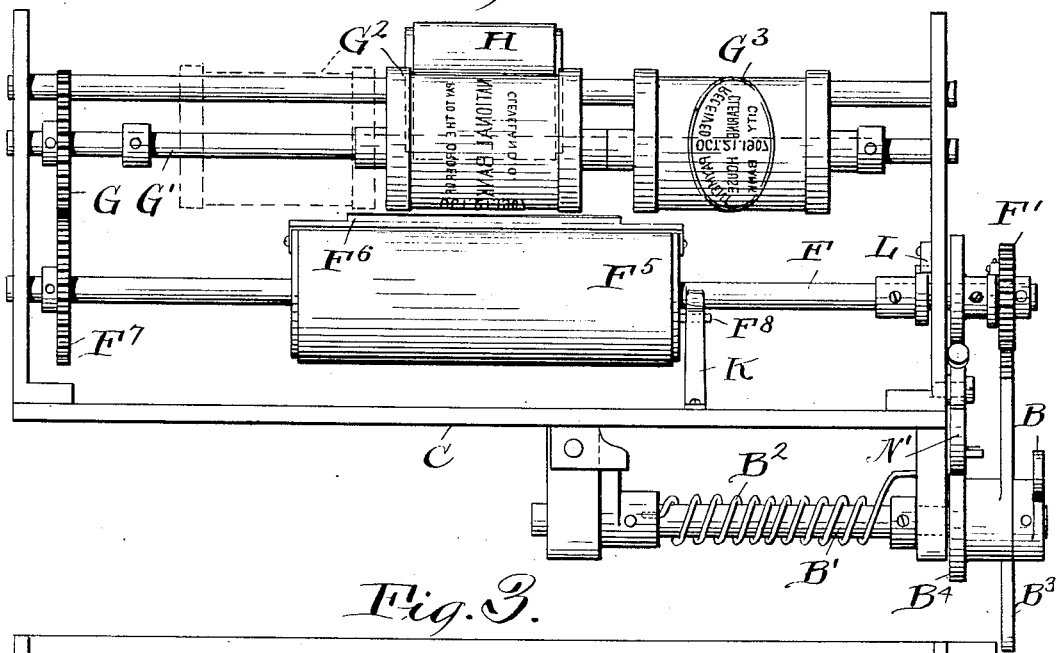
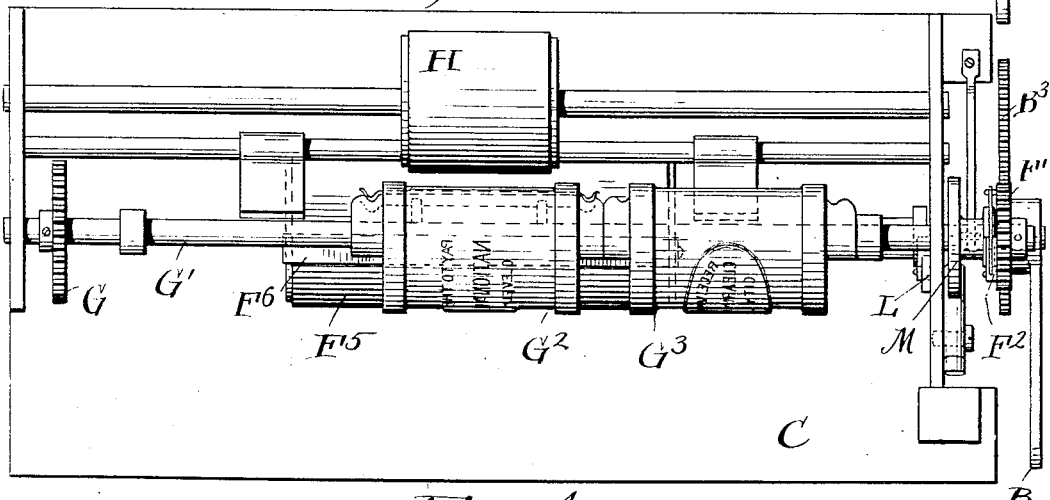
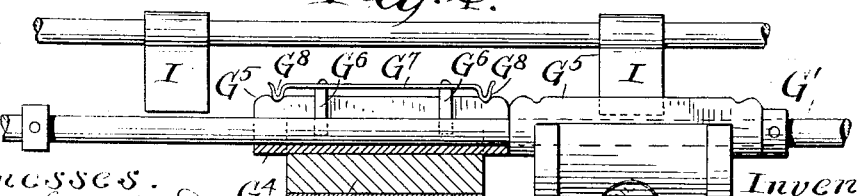

J. H. WHITELAW.
COMBINED TABULATING AND INDORSING APPARATUS.
APPLICATION FILED DEC. 7, 1907.
964,724.
Patented July 19, 1910.
3 SHEETS—SHEET 3.
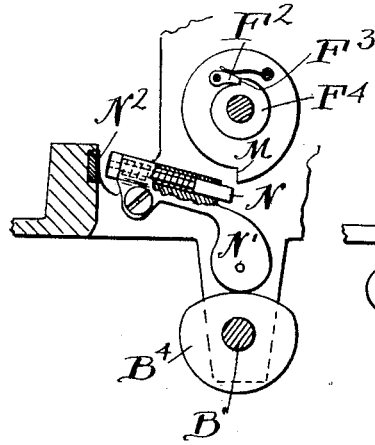
Fig. 6.
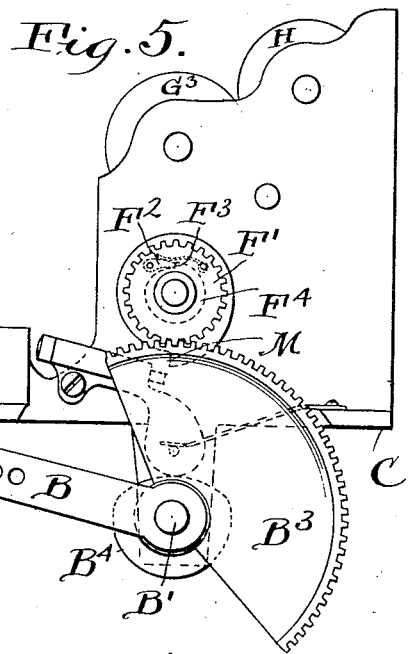
Fig. 5.
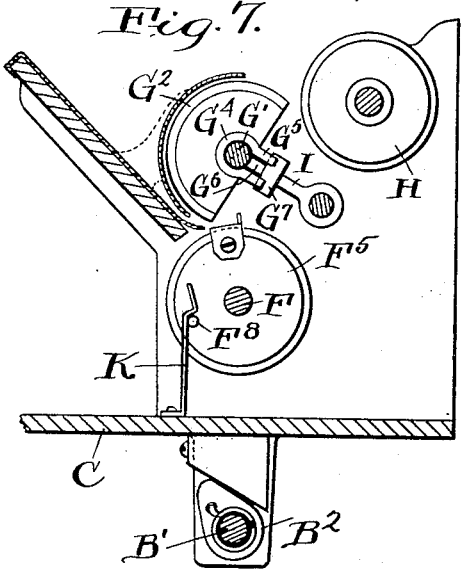
Fig. 7.
Fig. 8.
Witnesses
E. B. Gilchrist
H. R. Sullivan
Inventor
James H. Whitelaw
by
Austin Woodward
attys.

UNITED STATES PATENT OFFICE.

JAMES HERBERT WHITELAW, OF CLEVELAND, OHIO, ASSIGNOR TO THE WHITELAW COMBINED ENDORSING MACHINE COMPANY, OF CLEVELAND, OHIO, A CORPORATION OF OHIO.

COMBINED TABULATING AND INDORSING APPARATUS.

964,724.　　　　　Specification of Letters Patent.　　Patented July 19, 1910.

Application filed December 7, 1907. Serial No. 405,471.

*To all whom it may concern:*

Be it known that I, JAMES HERBERT WHITELAW, a citizen of the United States, residing at Cleveland, in the county of Cuyahoga and State of Ohio, have invented a certain new and useful Improvement in Combined Tabulating and Indorsing Apparatus, of which the following is a full, clear, and exact description.

The object of the present invention is to provide a combined recording and indorsing apparatus particularly applicable to such work as the tabulating and indorsing of bank checks.

More particularly my purpose is to provide a combination of recording and indorsing apparatus in such relation that the work of recording the matter appearing upon the face of the checks or other documents and the indorsement thereof may be effected simultaneously by one operator, and I have directed my attention to accomplishing this in such manner that the simultaneous action shall be positive and definite in its results.

A further object is to provide apparatus which shall be capable of handling checks with facility and despatch, placing the indorsements thereon effectively and delivering the checks away from the indorsing stamp so that they shall not interfere with the subsequent operation of the machine.

Further I have sought to arrange the apparatus in such manner that the operator may instantly change the character of the indorsement to suit such different characters of checks as it may be necessary or desirable to record or tabulate in the same group. For example, if it is desired to tabulate or record in one group the clearing house checks and the out of town checks so that a continuous recording operation may be had but a change of indorsements be necessary in the midst of the recording operation, the operator will be able to instantly make the necessary change in the indorsing mechanism by which the desired result may be achieved.

These and other advantages, such as simplicity in connections and noiselessness of operation are attained by the embodiment of my invention described in the following specification, reference being had to the accompanying drawings, in which:

Figure 1 is a perspective view of the machine. Fig. 2 is a front elevation of the indorsing mechanism. Fig. 3 is a plan view of the same. Fig. 4 is a detail showing the structure of the interchangeable indorsing rolls. Fig. 5 is an end elevation showing the operating connection for the indorsing apparatus. Fig. 6 is a detail section showing the structure of the cam operated stop for the indorsing rolls. Fig. 7 is a cross section of the indorsing apparatus taken inside the end frame. Fig. 8 is a detail section looking in the opposite direction from that in Fig. 7, showing the structure of an indorsing roll and a guide therefor.

The tabulating or recording mechanism A, as shown, is provided with the usual actuating hand lever A', which is to be drawn forward by the operator to effect the recording of each amount which it may be desired to transcribe from the checks being handled. I may, of course, use any sort of actuating device for throwing the recording mechanism into action that may be desired, but for purpose of illustration I have shown a hand lever connected directly to the main operating shaft $A^2$. Secured to this operating shaft is a link $A^3$ connected by a short arm B with a rock shaft B' hung below the bed plate C on which the indorsing mechanism D is mounted. This shaft B' and the arm B which is rigid therewith are under the influence of the spring $B^2$ wound on the shaft tending to hold the shaft and arm in the position shown in the drawings, so that an oscillatory segmental rack $B^3$, which is rigidly attached to the shaft, shall be near one extreme of its operating path. Also rigid with the shaft and rotatable therewith is a cam disk $B^4$, the function of which will be subsequently pointed out.

Mounted above the segmental rack and loosely rotatable upon the end of the feed roll shaft F is a pinion F' meshing with said rack and having a spring pressed pawl $F^2$ on its inner face adapted to fall into and engage a notch $F^3$ in the periphery of one end of a rotatable spool shaped sleeve $F^4$ which is pinned to the aforesaid shaft. By this means an intermittent motion in a forward direction is given to the feed roll shaft.

The feed roll $F^5$, which is rigidly connected with the shaft, is preferably provided with a retaining metal flange $F^6$ on the periphery thereof suitably located to receive the edge of the check that is fed thereto and prevent it slipping through, an expedient which is rendered necessary by the fact that I prefer to use semi-cylindrical indorsing rolls which are not in engagement with the feed roll in their normal or "at rest" position.

On the end of the feed roll shaft a suitable gear $F^7$ transmits motion to a second gear G connected to and operating the indorsing stamp shaft $G'$. The indorsing stamps which, in the present instance, are two in number, $G^2$ $G^3$, are semicircular in shape and interchangeable, being slidable on their shaft by reason of being mounted on slit metal sleeves $G^4$,—these sleeves having longitudinal lips $G^5$ extending therefrom at each side of the slit. By this arrangement the stamps may be shifted back and forth along the shaft into and out of operating position. For the purpose of communicating positive rotary motion to the stamps I provide on the shaft rigid posts $G^6$ which will project through the slit of the stamp sleeves and I provide on the extremity of these posts a leaf spring $G^7$ adapted to drop into depressions $G^8$ on the edge of the sleeve lips and thus retain either stamp in the operating position, in which it engages the inking pad H on each revolution.

When it is desired to change the indorsing stamps, as, for example, in shifting from the clearing-house indorsement stamp to the out-of-town indorsement, it is merely necessary to push the operating stamp to one side, the retaining spring $G^7$ being yieldable so that this may be accomplished with a slight endwise pressure. When an indorsing stamp has been shifted from operating position it is retained against rotation by means of a tongue I rigidly supported adjacent thereto, and located so as to pass between the lips $G^5$ on the sides of the slit of the stamp sleeve. It will be observed that there are two tongues, one at each end of the frame for this purpose,—these tongues being located at a suitable distance from the posts $G^6$ on the stamp shaft, so that the stamps do not have an opportunity to turn relatively to the shaft while being shifted from the posts to the retaining tongue.

It will be seen on referring to Figs. 2 and 7 that I provide a leaf spring K mounted on the bed plate and engaging a pin $F^8$ projecting from the end of the feed roll for the purpose of preventing the pressure of any check or paper shoved into feeding position and against the retaining flange on the feed roll from giving the roll a rotation in advance of the operation of the mechanism as a whole. It will also be seen by referring to Figs. 2 and 8 that I provide a spring-pressed detent L on the end frame adapted to prevent any backward rotation on the part of the roll so that it will always, when at rest, be in proper position to receive the papers to be indorsed.

In view of the intermittent character of the forward feed of the indorsing mechanism it is necessary to provide means whereby it shall stop at a definite point in each operation, that is, in this case, after each complete revolution, and I accomplish this by providing a projecting shoulder M on the inner end of the sleeve $F^4$ before mentioned as pinned to the outer end of the feed roll shaft. This sleeve, which is spool-shaped, has, of course, the exact angular movement of the shaft and controls the position of the entire indorsing mechanism after it has once received its motion from the segmental rack through the means of the pinion $F'$ loosely journaled on the end of the roll shaft. The projecting shoulder on the inner end of the sleeve or spool is so located that just as it reaches the end of its circular path of travel, it may be engaged by a stop N which is thrown up into the path of the shoulder by means of the cam disk $B^4$, previously referred to as mounted on the short shaft which operates the segmental rack. This cam disk is, of course, so shaped as to permit the stop N to lie out of the path of the shoulder M during the first movement of the latter, but will raise the stop into the said path at the proper time—that is, at the end of the complete revolution of each indorsing mechanism.

The stop, which I have adopted, is shown as comprising a pivoted arm $N'$, which is held by spring pressure downward against the operating cam $B^4$. This arm has preferably a spring-pressed or cushioned rod mounted therein, one end of which engages the shoulder on the periphery of the sleeve, as above set forth. I also prefer to locate in the frame, adjacent to the stop, a rubber insert $N^2$ to receive the end thrust of the stop rod and deaden the noise of operation.

Inasmuch as the motion communicated to the operating arm is reciprocatory and the actuating mechanism of the tabulating apparatus is reciprocatory, the reciprocating connections returning to their normal position under spring tension at the end of each operation, it will be seen that the segmental rack will always drop back to the position shown in Fig. 5, the cam, of course, simultaneously assuming the position also shown in Fig. 5, and permitting the stop N, which has arrested the movement of the indorsing stamps, to drop out of the path of the shoulder on the periphery of the sleeve thereabove, thus affording the feed roll shaft a free path for rotation at the next operation.

In the handling of the checks the operator will, after punching the various recording keys on the machine, drop the check onto the feed table into position to be indorsed and then pull the hand lever or other mechanism which operates the tabulating machine. This action will cause the check which is being tabulated to pass under the indorsing stamp and receive the proper indorsement thereon and be fed out of the way therefrom, so that it need not be subsequently handled, and there will be no chance for oversight in the matter of the proper indorsement, and no confusion as to the kind of indorsement that shall be made. Upon the release of the handle A', by the operator, the spring $B^2$ returns the gear-segment $B^3$ and pinion F' to the position shown in Fig. 5, the pawl $F^2$ sliding on the periphery of the sleeve $F^4$, without retarding or affecting the forward movement as the shaft F and the feed rolls and stamps may have due to momentum, until the shoulder M on said sleeve strikes the stop N, if it has not already done so before the operator released the handle A'. Since the indorsing stamps are semi-circular merely, the checks fall out in the rear of the feed-roll.

With the tabulating or recording machines heretofore in actual use there has been no means provided for anything more than the mere recording and computing of the various sums which the operator may elect, and in the handling of a large number of bank checks with the old machines the operator has first recorded the various sums appearing on the checks, and, after each individual check was thus recorded, it was then laid to one side until the entire bundle was properly tabulated. It was then necessary to either immediately indorse these checks with whatever indorsement the particular bundle should have or otherwise keep the several bundles together and separate them at some subsequent time, at which time the proper indorsement would be placed thereon.

I am aware that it has been proposed to provide a reciprocating stamp for the purpose of indorsing the checks which are being tabulated, but the mechanism involved in such machines is so decidedly inferior for accomplishing the results desired with rapidity, and so ineffective with regard to its features of operation that I have sought to avoid those defects by the arrangement disclosed in this application,—the operation of which is thought to be clear.

It is to be noted that with the arrangement of mechanism which I have provided the operation of the various sub-mechanisms will be such that there will be no shock transmitted from one to the other or to the operating handle, and yet the parts will be stopped and brought to an absolute definite and fixed position at the end of each operation, so that absolute certainty of action is had each time without the necessity of constant care and manipulation on the part of the operator.

Having thus described my invention, I claim:

1. The combination in a machine of the class described, of an actuating member for recording mechanism, an indorsing stamp and connections between the actuating member and the indorsing stamp adapted to transmit movement to the latter, and means independent of said connections adapted to stop the movement of the indorsing stamp at a certain point in its movement.

2. The combination in a machine of the class described, of an actuating member for recording mechanism, a rotary indorsing stamp, a connection between the rotary indorsing stamp and the said actuating member, and means adapted to present a yielding resistance to the movement of the stamp at a certain point in its rotary movement.

3. The combination in a machine of the class described, of an actuating member for recording mechanism, an indorsing stamp. connections between the actuating member and said indorsing stamp adapted to impart an intermittent forward motion to the indorsing stamp, and means independent of said connections to bring the indorsing stamp to rest at a certain point after each operation thereof.

4. The combination in a machine of the class described, of a reciprocatory actuating member for recording mechanism, a rotary indorsing stamp, connections adapted to operate the indorsing stamp simultaneously with the movement of the tabulating mechanism and means for stopping the movement independently of any subsequent movement of the tabulating mechanism.

5. The combination in a machine of the class described, of an actuating member for recording mechanism, a shaft connected thereto to turn in one direction only, a plurality of interchangeable indorsing stamps carried by said shaft, and means independent of its connection to said actuating member to stop the rotation of said shaft at a certain point in its movement.

6. The combination in a machine of the class described, of an actuating member for recording mechanism, a shaft connected thereto to turn in one direction only, a feed roll on said shaft, a second shaft geared to the first and carrying a plurality of interchangeable indorsing stamps, one of which coöperates with said roll, and means independent of its connection to said actuating member to stop the rotation of said shafts after they have turned a certain amount.

7. The combination in a machine of the class described, of an actuating member for recording mechanism, a shaft connected thereto to turn in one direction only, a feed roll on said shaft, a second shaft geared to the first and carrying a plurality of interchangeable indorsing stamps, one of which coöperates with said roll, means to prevent rotation of said stamps when in operating position, and means to stop the rotation of said shafts after they have turned a certain amount.

8. In a machine of the class described, the combination with an actuating handle for recording mechanism, of a rotary indorsing mechanism, means connecting the latter to said handle when the latter is moved forward only, a yielding stop for said indorsing mechanism, and means actuated by the forward movement of the handle to raise said stop into operative position.

9. In a machine of the class described, the combination with an actuating handle for recording mechanism, of a rotary indorsing mechanism, gearing operatively connected to said handle, a pawl and ratchet mechanism between said gearing and said indorsing mechanism, whereby the latter is only actuated during the forward movement of said handle, a yielding stop to limit the movement of said indorsing mechanism, a cam connected to said gearing to raise said stop into operative position, during the forward movement of said handle and allow it to return to inoperative position during the return movement of said handle, a spring to return said gearing to its initial position, and a stop to limit its return movement.

In testimony whereof, I hereunto affix my signature in the presence of two witnesses.

JAMES HERBERT WHITELAW.

Witnesses:
E. B. GILCHRIST,
H. R. SULLIVAN.